United States Patent [19]
Hayashi et al.

[11] Patent Number: 5,642,201
[45] Date of Patent: Jun. 24, 1997

[54] ELECTROGRAPHIC COPYING MACHINE

[75] Inventors: Shinji Hayashi; Masaya Fujimoto; Katsumi Amakawa, all of Osaka, Japan

[73] Assignee: Mita Industrial Co., Ltd., Osaka, Japan

[21] Appl. No.: 348,204

[22] Filed: Nov. 28, 1994

[30] Foreign Application Priority Data

Dec. 3, 1993 [JP] Japan ..................................... 5-304039

[51] Int. Cl.$^6$ ..................................................... H04N 1/00
[52] U.S. Cl. ...................... 358/400; 358/497; 250/201.2; 355/55; 396/125
[58] Field of Search ................................ 358/400, 401, 358/471, 474, 497; 354/400, 402; 348/345; 250/201.2, 201.7; 355/208, 55, 56

[56] References Cited

U.S. PATENT DOCUMENTS 4,788,426  11/1988  Kuehnle .......................... 358/400
4,843,413  6/1989  Walther .......................... 354/402

*Primary Examiner*—Thomas D. Lee
*Attorney, Agent, or Firm*—Beveridge, DeGrandi, Weilacher & Young, L.L.P.

[57] ABSTRACT

An electrographic copying machine in which an image projected on an original glass stand by a film projector is read out by a scanner and copied is provided with a color scanner including a CCD for reading out a projected image, a smoothing processing unit for averaging the tone data of pixels outputted from the color scanner every four pixels, a difference value totaling unit for totaling the difference values between the averaged tone data, and a control unit for performing focusing of the film projector so that the total of the difference values is maximum. The focusing of the projected image is automatically performed.

8 Claims, 12 Drawing Sheets

ELECTROGRAPHIC COPYING MACHINE

BACKGROUND OF THE INVENTION

1. Field of the Invention

The present invention relates to an electrographic copying machine where an image on an original glass stand projected by a film projector is read out by a scanner and copied, and more particularly, to a digital color electrographic copying machine.

2. Description of the Prior Art

Conventionally, such a film projector is set on a digital color electrographic copying machine as shown in FIG. 10. Reference numeral 1 represents a projector body incorporating a lamp (not shown) serving as a light source, a projector lens 2 and a loading portion 3 in which positive or negative film (mounted or stripped film) is loaded. Reference numeral 4 represents a mirror unit including a reflecting mirror 5 and a Fresnel lens (dispersing plate) 6. Light from the lamp is irradiated onto the film. Light transmitted by the film is directed to an original glass stand (contact glass) 7 of the copying machine by way of the projector lens 2, the reflecting mirror 5 and the Fresnel lens 6 to thereby project the image on the film onto the original glass stand 7.

To project an in-focus image on the original glass stand 7, it is necessary to adjust the position of the projector lens 2. Conventionally, whether an in-focus image is projected or not is determined by reading out an image on the original glass stand 7 by a color scanner 8 of the copying machine, and by a control signal based on a result of the determination, the position of the projector lens 2 is automatically adjusted (what is called, automatic focusing). To adjust the position of the projector lens 2, a stepping motor 9 of the projector body 1 is driven as shown in FIG. 11 by a control signal from the copying machine to move a cylinder 13 for holding the projector lens 2 backward and forward by variable speed gears 10, 11 and 12 and a teeth portion 13A.

Specifically, the projector lens 2 is moved by the stepping motor 9 from a home position (the forefront) to the rearmost end by a predetermined step while a charge coupled device (CCD) of R, G, B line structure of the color scanner 8 is located in the vicinity of the center of the projection area (image). During the movement of the projector lens 2, image data are read out by the CCD at each step position. In this case, 8-bit green image data (256 tones) of approximately 4800 pixels are read out for one line. Then, difference values of image data are obtained for 4800 pairs of adjoining pixels. The projector lens 2 is moved and fixed to a step position where the total of the difference values is maximum.

For example, when the projected image is a letter "A", if the image is in focus as shown in FIG. 12, the image (tone) data sampled (read out) by the CCD in the main scanning direction at an A–A' position is as shown in FIG. 13. If the image is out of focus as shown in FIG. 14, the outline (density) of the image is not sharp and, for example, black looks like grey, so that the image (tone) data sampled by the CCD in the main scanning direction at the A–A' position is gentle as shown in FIG. 15. For this reason, when the total of the difference values between adjoining pixels at the A–A' position at the lens positions (the projector lens 2 is moved from the forefront to the rearmost end) is obtained, as shown in FIG. 16, the total of the difference values is maximum at a lens position "1" where the image is in focus and the total of the difference values is considerably small at a lens position "2" where the image is out of focus.

Conventionally, in obtaining the total of the difference values, the difference values are obtained by obtaining the difference among image data for every adjoining pixels and squaring the difference (so that the difference may not take a negative value), for example, as shown in FIG. 1, $(100 \text{ tones} - 104 \text{ tone})^2 = (-4)^2$, and the total of the difference values for one line is obtained. Therefore, the result of the calculation is an extremely high value when the total of the difference values for many pixels is obtained. As a result, the calculation takes a long time. If the number of pixels used as samples is reduced, the calculation amount and processing time are reduced; however, the exact in-focus position of the lens cannot be detected.

Moreover, since the difference between image data is obtained for every adjoining pixels, when the image data of a pixel with which a noise component is mixed increases extremely, the effect of the noise component is directly reflected in the difference value. For example, when a number of high-value noise components are mixed at a lens position "3", a false peak of the total of the difference values is created by the noise components as shown in FIG. 2, so that the projector lens 2 may mistakenly be set at the lens position "3".

Further, since the position of the sampling by the CCD for automatic focusing is fixed to the vicinity of the center of the projected image, when the image at the sampling position is, for example, an image at a B–B' position as shown in FIGS. 12 and 14, the image data for one line lacks variation as shown in FIGS. 17 and 18, and the total of the difference values of adjoining pixels at the B–B' position at the lens positions is gentle and of low value as a whole as shown in FIG. 19. For this reason, the total of difference values at the lens position "1" where an in-focus image as shown in FIG. 12 is obtained is small and may be below a threshold value necessary for the lens position to be determined to be the in-focus lens position. In that case, the automatic focusing processing cannot be performed.

SUMMARY OF THE INVENTION

An object of the present invention is to provide an electrographic copying machine which correctly performs an automatic focusing processing in a short period of time in reading out by a scanner an image on the original glass stand projected by a film projector and copying the image.

To achieve the above-mentioned object, according to the present invention, the image data from a scanner set at a predetermined reading out position is averaged every plural pixels, the difference values between the averaged data are obtained, and focusing is performed so that the total of the difference values is maximum. Specifically, the automatic focusing means averages the image data from the scanner every four pixels, and the difference values are obtained by subtracting lower data values from higher data values obtained by the averaging. Thinning out may be performed in totaling the difference values.

Prior to the focusing, the scanner is automatically set at the predetermined reading out position suitable for focusing of the image.

With such features, in the automatic focusing of the projected image, the scanner (CCD) can be set at an image reading out position most suitable for the focusing. Since the image data from the set scanner is averaged every four pixels and the difference values between the image data obtained by the averaging is obtained by subtracting lower data values from higher data values, the calculation result and the processing time can be reduced. Further, by the averaging, focus errors caused by noise components mixed with the image data is minimized.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, a digital color electrographic copying machine on which a film projector is set will be described as an embodiment of the present invention with reference to the drawings. The same portions and elements as those of the prior art are denoted by the same reference designations and will not be described.

Figure 1:
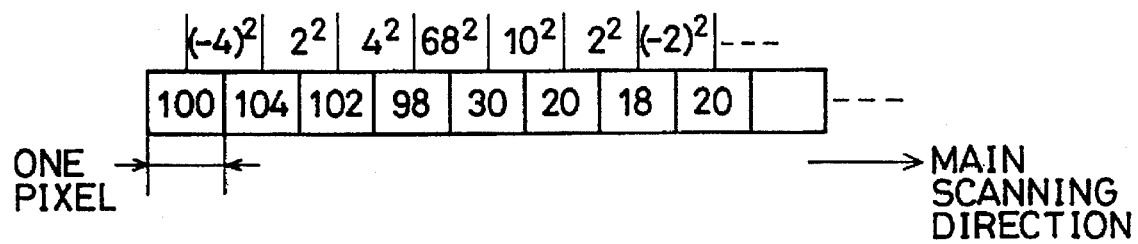
FIG. 1 is a view of assistance in explaining how difference values are conventionally obtained.
Figure 2:
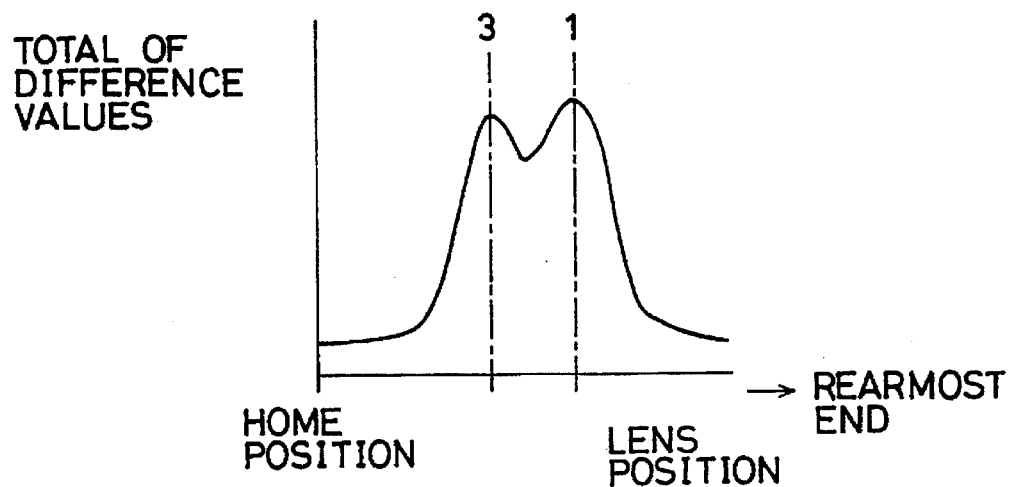
FIG. 2 shows an example of the total of difference values influenced by a noise component.
Figure 3:
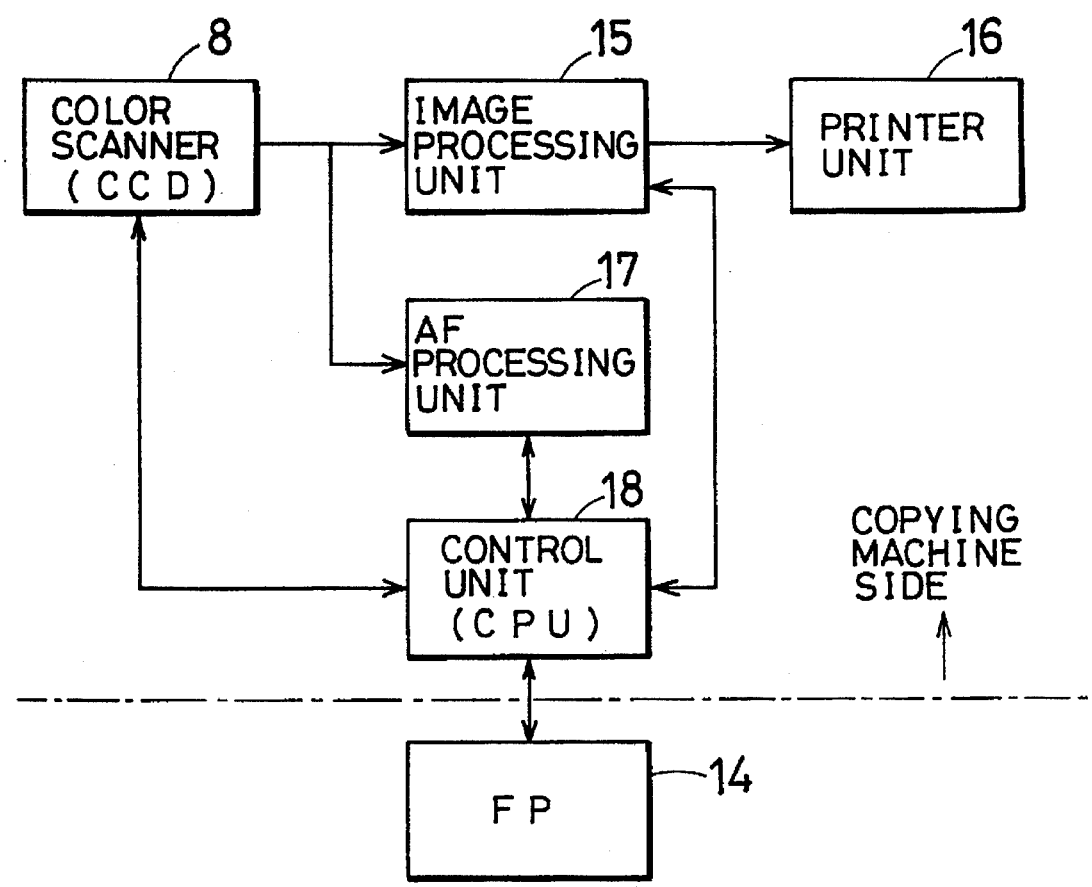
FIG. 3 is a block circuit diagram of the present invention.

Referring to FIG. 3, there is shown a block circuit diagram of such a digital color electrographic copying machine. Reference numeral 14 represents a film projector including a projector body incorporating a projector lens 2, and a mirror unit 4. Reference numeral 15 represents an image processing unit which performs signal processing (conversion of the image data to an image data representative of a toner density, and color correction) necessary for image formation to an image data from a color scanner 8. The color scanner 8 is of the close sensor type where a lamp, a mirror and a CCD are integrated.

Reference numeral 16 represents a printer unit which forms a color image with yellow, magenta and cyan toner on a sheet of paper on receipt of an output from the image processing unit 15. Reference numeral 17 represents an automatic focusing processing unit which performs signal processing (the image data from the color scanner 8 is averaged, in this case every four pixels, and the difference values between the image data obtained by the averaging are obtained by subtracting lower data values from higher data values) necessary in performing automatic focusing of the image projected on an original glass stand 7 by the film projector 14. Reference numeral 18 represents a control unit (comprising a microcomputer (CPU)) which controls the color scanner 8, the image processing unit 15, the printer unit 16, the automatic focusing processing unit 17 and the film projector 14 in accordance with an operation at an operation portion. For example, for the film projector 14, ON/OFF of the lamp as a light source and the movement of the projector lens 2 for automatic focusing are controlled.

Figure 4:
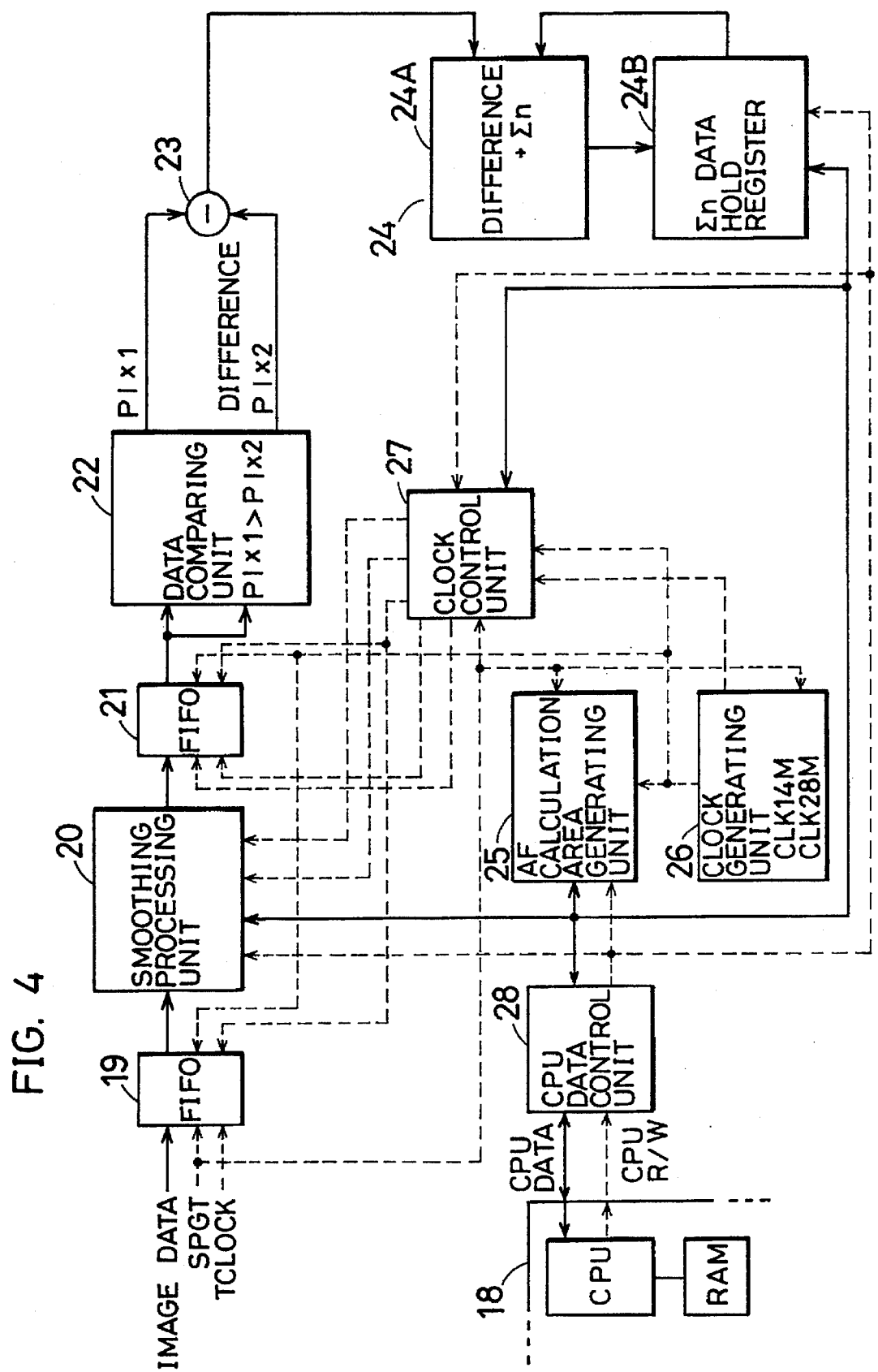
FIG. 4 shows a specific example of an automatic focusing unit thereof.

Referring to FIG. 4, there is shown a specific arrangement of the automatic focusing processing unit. Here, the solid line represents a data line through which an image data flows, and the dotted line represents a control line through which a control signal flows. Reference numeral 19 represents a line memory (FIFO) for storing a line of image data from the CCD of the color scanner 8. Reference numeral 20 represents a smoothing processing unit which averages the image data every four pixels and outputs the result. Reference numeral 21 represents a line memory (FIFO) for storing a line of image data obtained by the averaging. Reference numeral 22 represents a data comparing unit which compares the values of the image data obtained by the averaging to subtract lower data values from higher data values. Reference numeral 23 represents a subtracter which obtains the difference values between the image data obtained by the averaging. Reference numeral 24 represents a difference value totaling unit which totals the difference values for a line of the image data. The difference value totaling unit 24 includes an adding unit 24A which successively adds the difference values from the subtracter 23 to an output from a storing unit, and the storing unit 24B for storing the results of the addition.

Reference numeral 25 represents an automatic focusing calculation area generating unit which performs the setting of the number of pixels averaged by the smoothing processing unit 20 (in this embodiment, the set number of pixels is four) and the setting of the addition of the difference values by the difference value totaling unit 24 (for example, the difference values are added every other value). Reference numeral 26 represents a clock generating unit. Reference numeral 27 is a clock control unit of the clock generating unit 26. Reference numeral 28 represents a CPU data control unit. For example, the result of the totaling of the difference values for a line by the difference value totaling unit 24 is read out by the control unit 18 through the CPU data control unit 28 and stored in a random access memory (RAM) of the control unit 18. SPGT represents a signal for reading in the image data (256 tones) transmitted from the scanner 8. The signal SPGT is active while image data of approximately 4800 pixels of the CCD are being transmitted.

Figure 5:
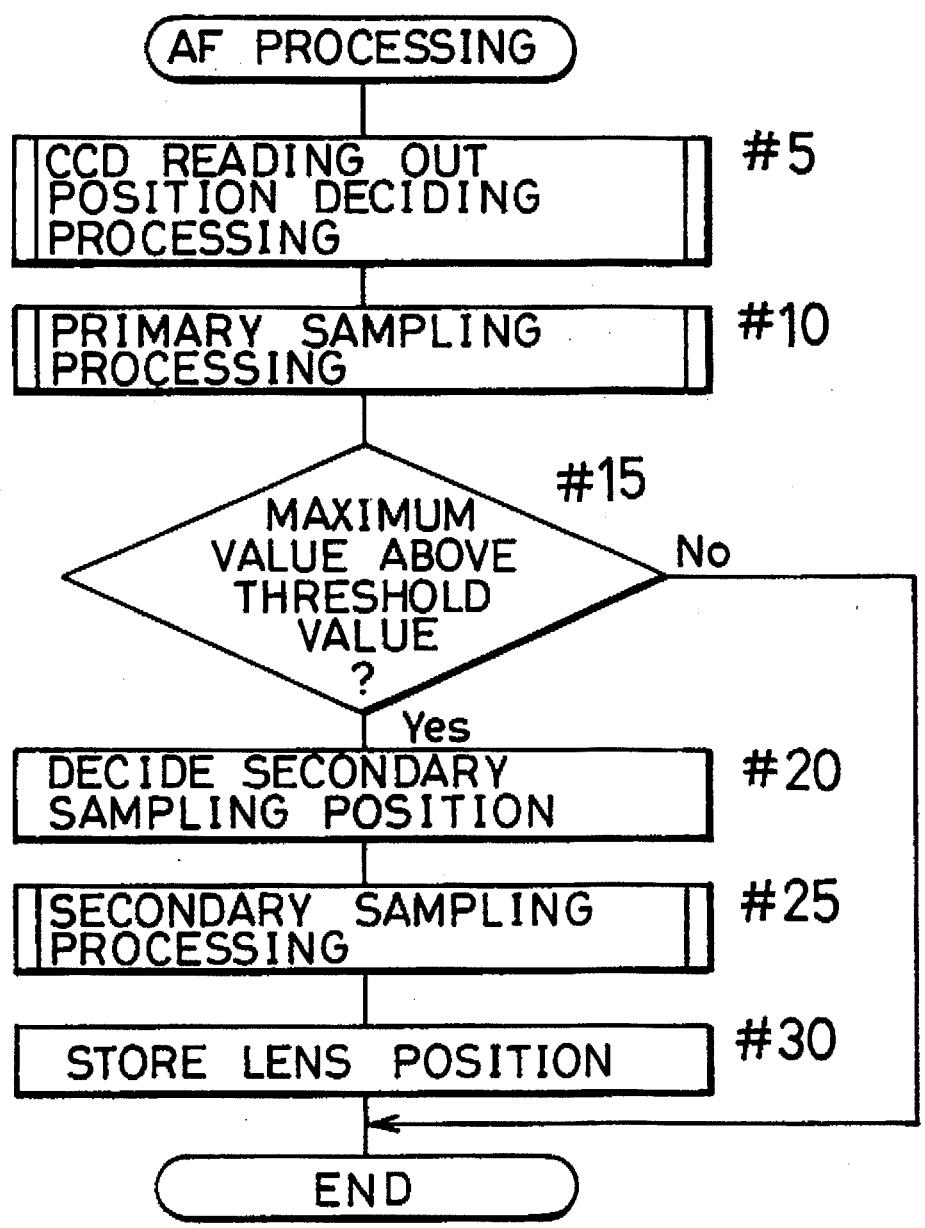
FIG. 5 is a flowchart of an automatic focusing processing thereof.

Subsequently, a control operation by the control unit 18 in this arrangement will be described with reference to the flowcharts of FIGS. 5 to 8. When an automatic focusing button (or copying button) is operated with the film projector being set, the automatic focusing processing of FIG. 5 is started. At step #5, a subroutine of a CCD reading out position deciding processing is executed.

Figure 6:
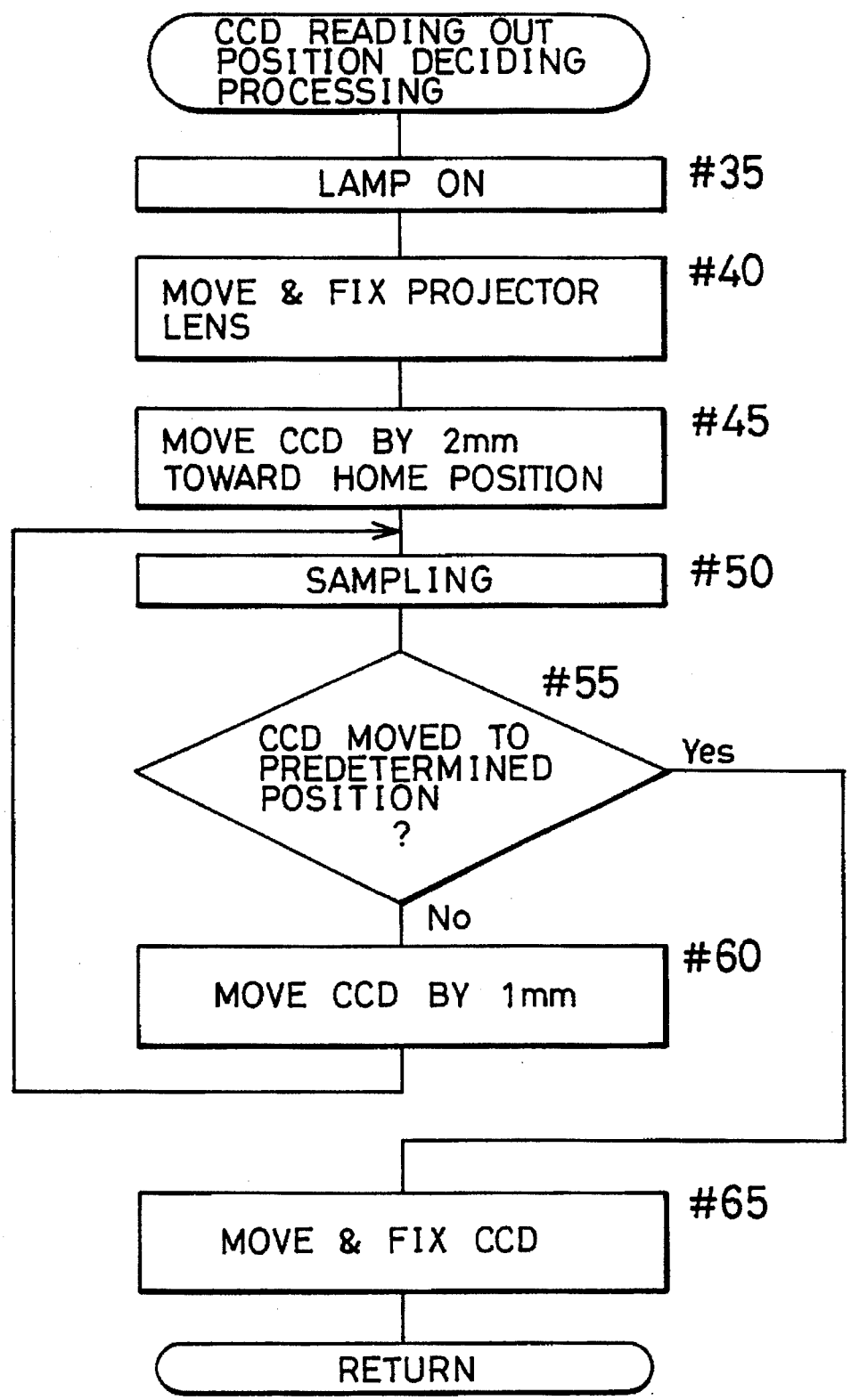
FIG. 6 is a flowchart of a CCD reading out position deciding processing thereof.

Referring to FIG. 6, there is shown the subroutine of the CCD reading out position deciding processing. At step #35, the light source lamp of the film projector 14 is turned on so that an image is projected on the original glass stand 7. Then, at step #40, a stepping motor 9 is controlled to move and fix the projector lens 2 to a central position (a midpoint between the forefront and the rearmost end). At step #45, the CCD (color scanner 8) is moved by 2 mm toward the home position of the CCD on the copying machine from the central position of the projection area, and is fixed to the position.

Then, at step #50, the sampling of a line of image data (approximately 4800 pixels) is performed by the CCD, and the signal processing is performed by the automatic focusing unit 17. Specifically, the sampled image data is averaged every four pixels by the smoothing processing unit 20, and the difference values of the averaged image data are obtained by the subtracter 23 by subtracting lower data values from higher data values. Then, the total of the difference values is obtained by the difference value totaling unit 24 and stored in the RAM.

At step #55, whether or not the CCD is located at a position shifted by 2 mm from the above-mentioned central position toward the END side (the rearmost end of the movement of the scanner) on the copying machine is determined. When it is determined that the CCD is not moved by 2 mm from the central position toward the END side, the process proceeds to step #60, where the CCD is moved by 1 mm toward the END side. Then, the process returns to step #50 to perform the sampling by the CCD and the signal processing by the automatic focusing processing unit 17. Then, steps #50, #55 and #60 are repeated until it is determined at step #55 that the CCD is located at the position where it has moved by 2 mm toward the END side.

When it is determined at step #55 that the CCD is located at the position where it has moved by 2 mm from the central position toward the END side, the process proceeds to step #65, where the CCD is moved to a position representative of the maximum value of the totals of the difference values obtained by the sampling by the CCD and fixed to the position as the reading out position. Then, the process returns to the control flow of FIG. 5.

Figure 7:
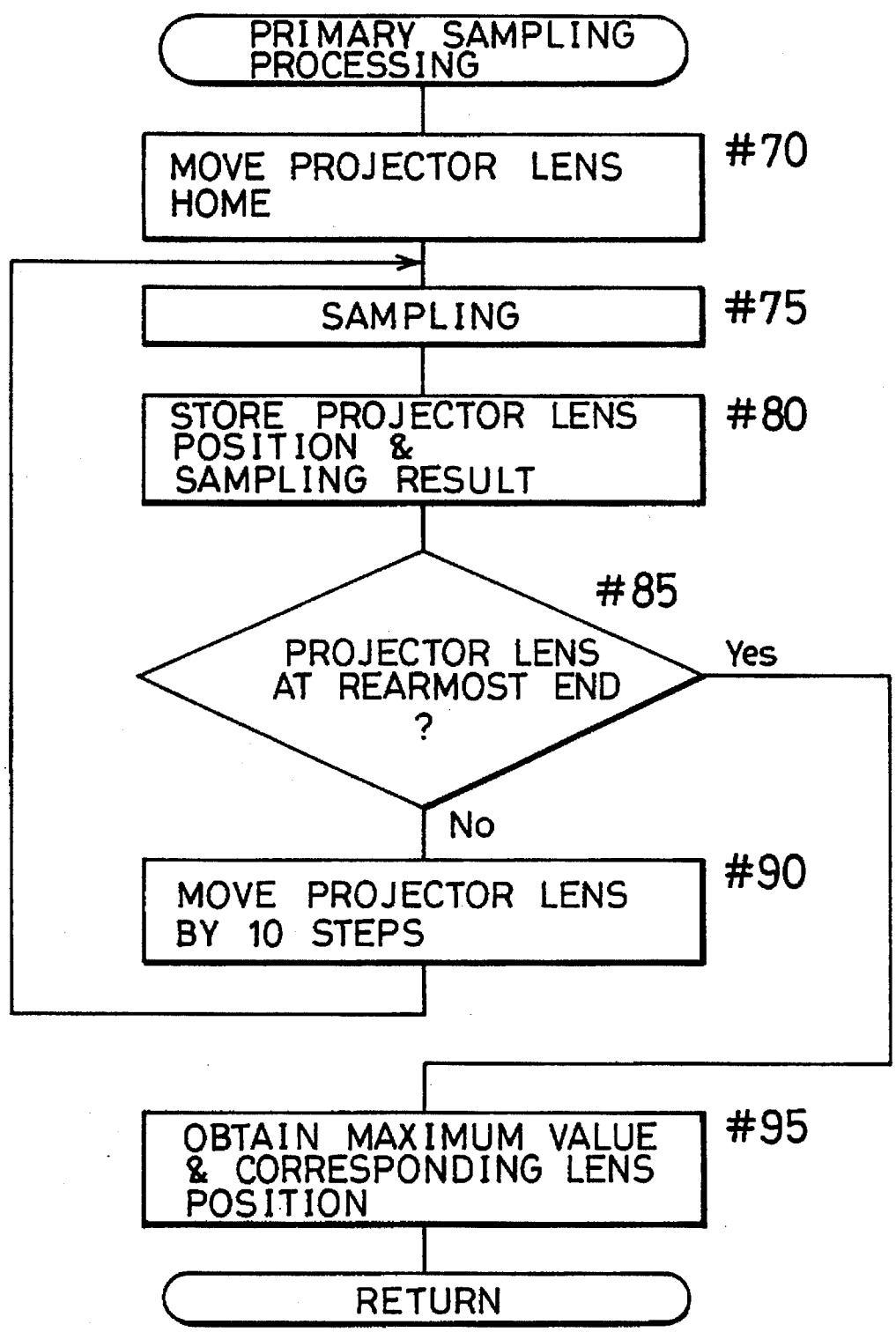
FIG. 7 is a flowchart of a primary sampling processing thereof.

After the subroutine of the CCD reading out position deciding processing has been executed at step #5, the process proceeds to step #10 to execute a subroutine of a primary sampling processing. Referring to FIG. 7 showing the subroutine of the primary sampling processing, at step #70, the stepping motor 9 is controlled to move the projector lens 2 from the central position to the home position (the forefront). Then, at step #75, the sampling of a line of image data is performed by the CCD having its position decided in a manner described above, and the signal processing is performed by the automatic focusing processing unit 17. Specifically, the sampled image data is averaged every four pixels, and the difference values of the image data obtained by the averaging are obtained by subtracting lower data values from higher data values. The difference values are totaled.

At step #80, the position of the projector lens 2 at that time and the total of the difference values which is a sampling result are stored in the RAM. Then, at step #85, whether the projector lens 2 is located at the rearmost end or not is determined. When it is determined that the projector lens 2 is not located at the rearmost end, the process proceeds to step #90, where the position of the projector lens 2 is moved by 10 steps (in this case, the maximum lens movement width is approximately 10 mm, the maximum lens step number is 150 and the movement width for one step is approximately 0.6 mm) toward the rearmost end. Then, the process returns to step #75. Then, steps #80, #85 and #90 are repeated until it is determined at step #85 that the projector lens 2 is located at the rearmost end, so that a sampling result at the lens position of each 10 step is obtained.

When it is determined at step #85 that the projector lens 2 is located at the rearmost end, the process proceeds to step #95 to obtain the maximum value of the totals of the difference values obtained by the sampling at the positions of the projector lens 2. Then, the process returns to the control flow of FIG. 5.

After the subroutine of the primary sampling processing has been executed at step #10, the process proceeds to step #15, where whether or not the maximum value of the difference value totals obtained by the sampling processing is above a threshold value necessary for the lens position being determined to be the in-focus position. When it is determined that the maximum value is not above the threshold value, since the automatic focusing cannot be performed, the automatic focusing processing ends. When it is determined that the maximum value is above the threshold value, at step #20, a subroutine of a secondary sampling processing is executed.

Figure 8:
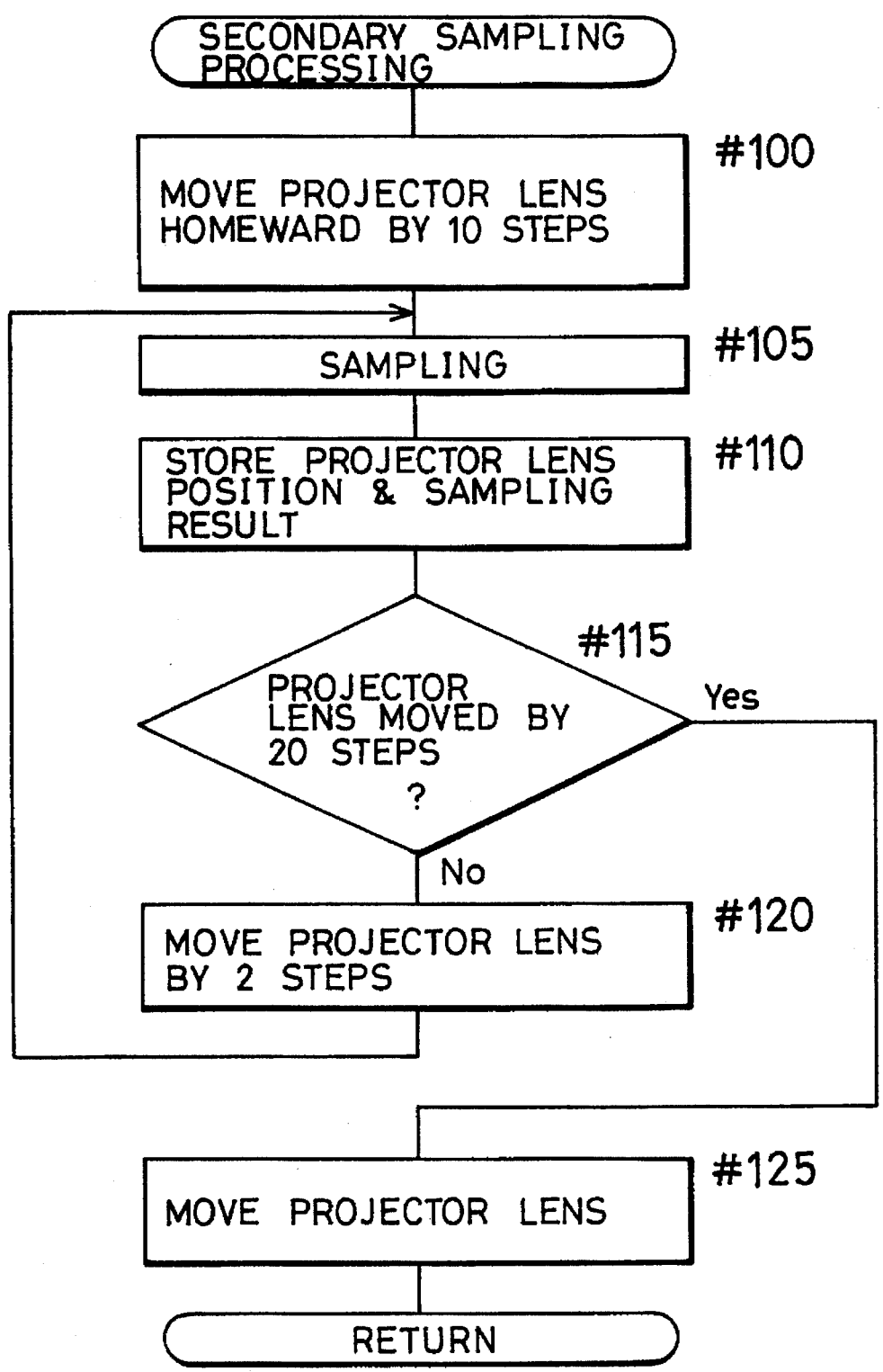
FIG. 8 is a flowchart of a secondary sampling processing thereof.

Referring to FIG. 8 showing the subroutine of the secondary sampling processing, at step #100, the projector lens 2 is moved by 10 steps from the position where the total of the difference values obtained by the primary sampling processing is maximum toward the home position (the forefront). Then, at step #105, the sampling of a line of image data is performed by the CCD having its position decided in a manner described above, and the signal processing is performed by the automatic focusing processing unit 17. Specifically, the sampled image data is averaged every four pixels, and the difference values of the image data obtained by the averaging are obtained by subtracting lower data values from higher data values. The difference values are totaled.

Then, at step #110, the position of the projector lens 2 at that time and the total of the difference values which is a sampling result are stored in the RAM. At step #115, whether or not the projector lens 2 has moved by 20 steps from the second sampling start position toward the rearmost end side is determined. When it is determined that the projector lens 2 has not moved by 20 steps, the process proceeds to step #120 to move the projector lens 2 by 2 steps toward the rearmost end side. Then, the process returns to step #105. Then, steps #105, #110, #115 and #120 are repeated until it is determined at step #115 that the projector lens 2 has moved by 20 steps, so that a sampling result at the lens position of each 2 step is obtained.

When it is determined at step #115 that the projector lens 2 has moved by 20 steps toward the rearmost end side, the process proceeds to step #125 to move the projector lens 2 to a position where the total of the difference values obtained by the sampling at each position is maximum. Then, the process returns to the control flow of FIG. 5. After a rough in-focus position is found by roughly moving the projector lens 2 by the primary sampling processing and an exact in-focus position is decided by moving the projector lens 2 by smaller amounts in the vicinity of the rough position, at step #30, the decided lens position is stored. Then, the automatic focusing processing ends.

When the image data from the CCD is averaged every four pixels and the difference values of the image data obtained by the averaging are obtained by subtracting lower data values from higher data values, the calculation result of the total of the difference values is comparatively small even at the maximum as shown in the following:

$$256 \times 1200 = 307200 \ (20 \ \text{bits})$$

where the image data is 0 to 255 tones (8 bits) and the number of pixels (dots) of one line of the CCD in the main scanning direction is approximately 4800. According to the conventional method in which the difference values among adjoining pixels are obtained and the difference values are squared to obtain the total of the difference values, the maximum value is very high as shown in the following:

$$256^2 \times 4800 = 314572800 \ (32 \ \text{bits})$$

Figure 9:
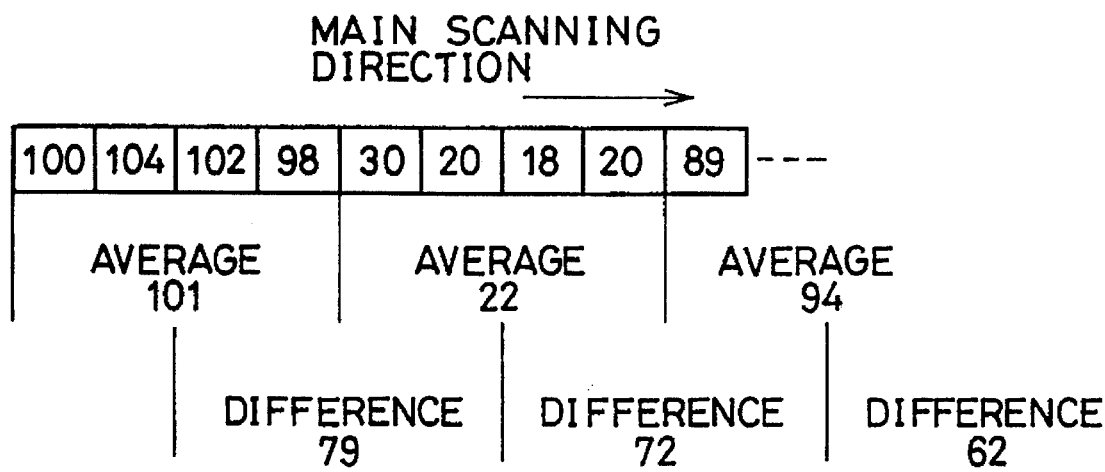
FIG. 9 is a view of assistance in explaining how difference values are obtained.
Figure 10:
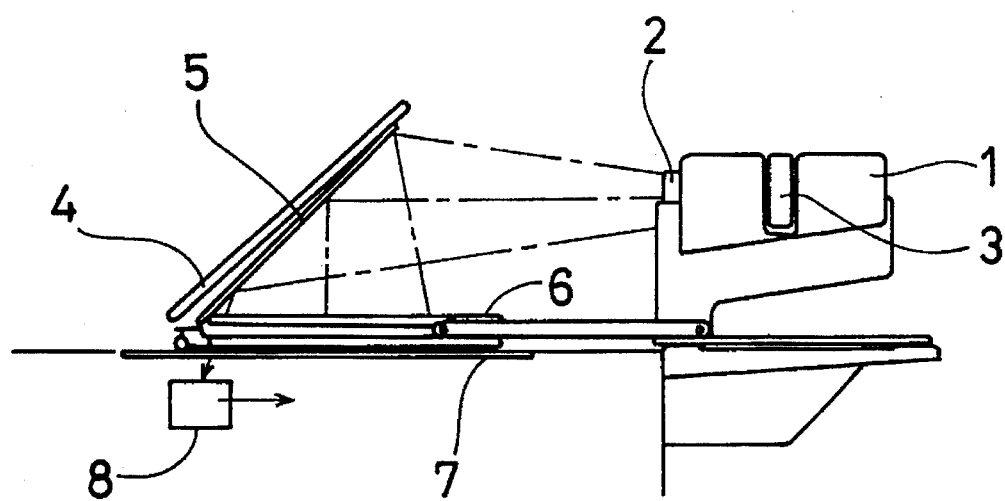
FIG. 10 shows a film projector used in the present invention.
Figure 11:
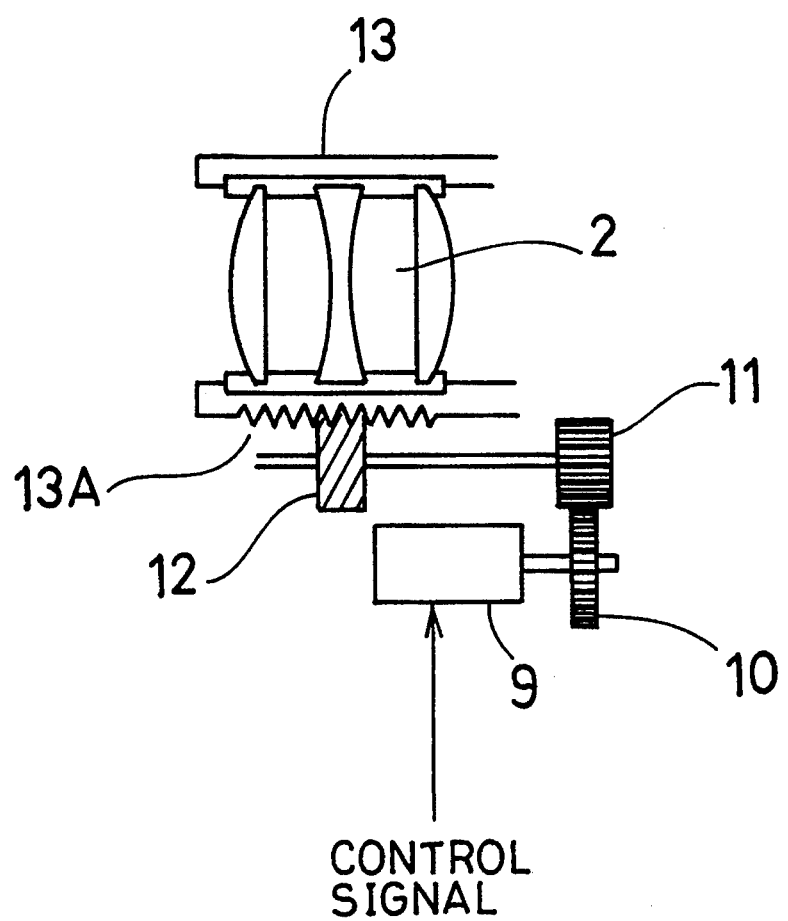
FIG. 11 shows an example of an arrangement for adjusting the lens position thereof.
Figure 12:
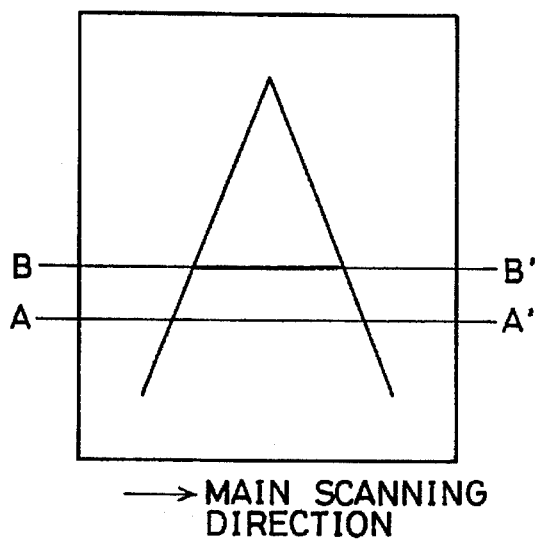
FIG. 12 shows an example of an in-focus image.
Figure 14:
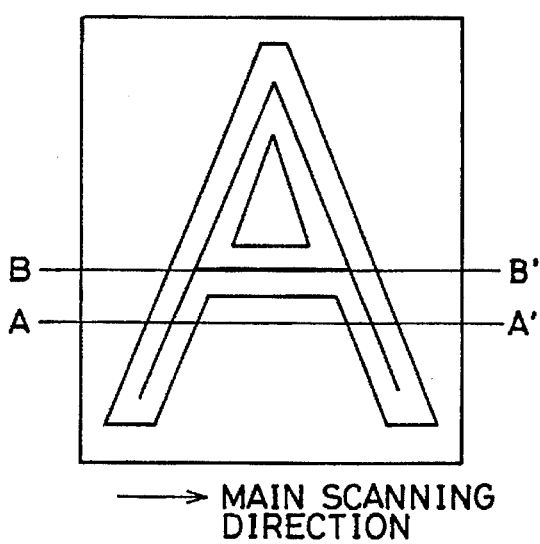
FIG. 14 shows an example of an out-of-focus image.
Figure 13:
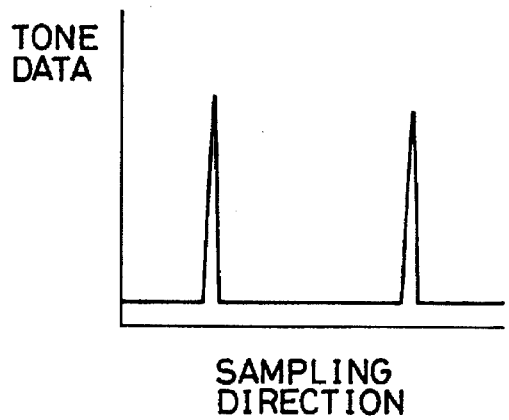
FIG. 13 shows an image data at an A–A' position thereof.
Figure 15:
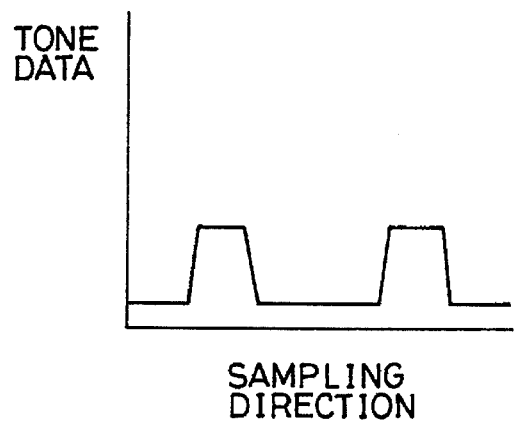
FIG. 15 shows an image data at an A–A' position thereof.
Figure 16:
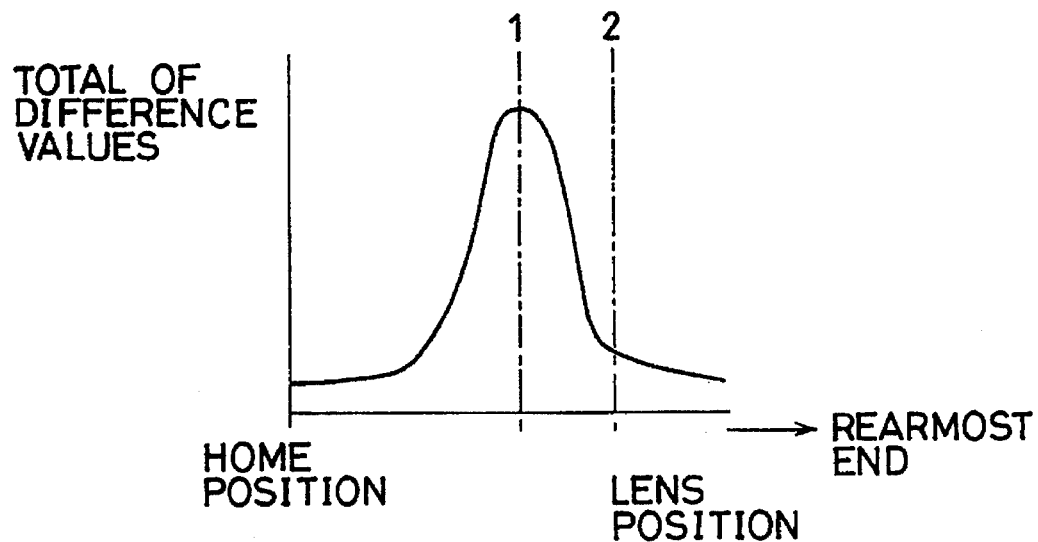
FIG. 16 shows the total of difference values at the A–A' position.
Figure 17:
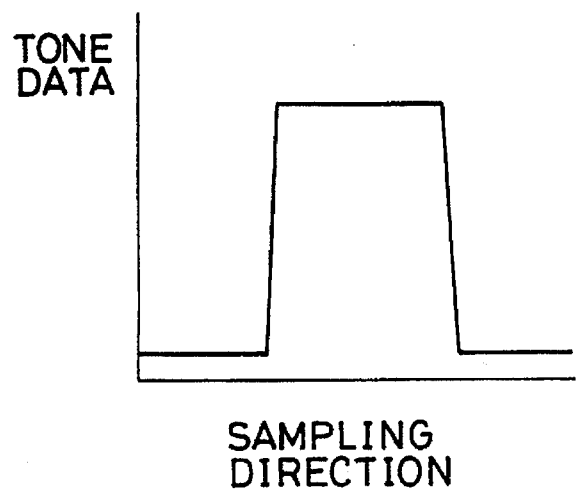
FIG. 17 shows an example of an image data at a B–B' position of FIG. 12.
Figure 18:
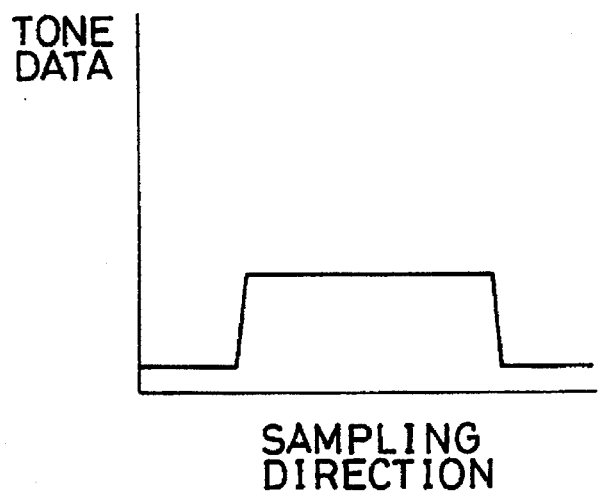
FIG. 18 shows an example of an image data at a B–B' position of FIG. 14.
Figure 19:
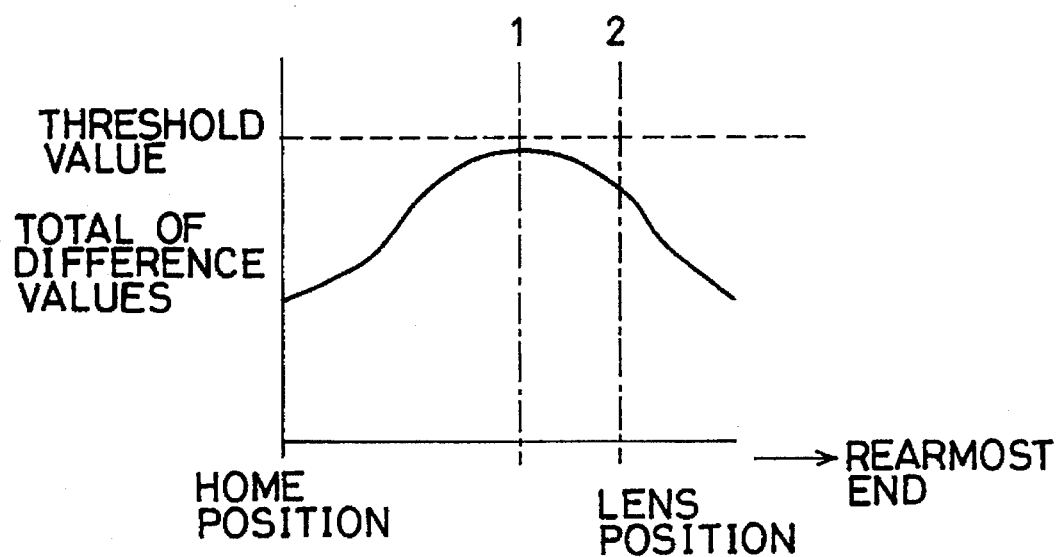
FIG. 19 shows the total of difference values at the B–B' position.

For example, if the difference values are successively obtained by the averaged 101 tones–22 tones, 94 tones–22 tones, ... as shown in FIG. 9 and the total of the difference values is obtained not by totaling all the difference values but by adding the difference values every other value such as the difference 79+the difference 62+..., the calculation result is further reduced:

$$256 \times 600 = 153600 \ (20 \ \text{bits})$$

When the CPU is of 16 bits, since the data which can be read in at a time (at one clock) is 16 bits, the lower 4 bits of the 20 bits may be deleted as an error range. The data of the upper 16 bits is used as the calculation result. Then, the calculation speed of the CPU is further increased.

The number of averaged pixels is set to four in order that focusing can be performed even when a 0.5-mm line image is read out by using a CCD of 400 dPI (one pixel is approximately 0.00635 mm). If the averaging is performed every 16 pixels, for example, the averaging is performed over the 0.5 mm line and a white background (portion where there is no image), and the image data of the 0.5 mm line disappears, so that focusing cannot be performed.

As described above, according to the electrographic copying machine of the present invention, in the automatic focusing of an image projected by the film projector, the calculation and time required for the automatic focusing are largely reduced. Further, the automatic focusing is correctly performed with the effect by noise being restrained.

Obviously, many modifications and variations of the present invention are possible in light of the above teachings. It is therefore to be understood that within the scope of the appended claims, the invention may be practiced other than as specifically described.

What is claimed is:

1. An electrographic copying machine in which an image projected on an original glass stand by a film projector is read out by a scanner and copied, the electrographic copying machine comprising:

automatic focusing means for performing focusing of the image projected on the original glass stand by averaging image data from the scanner, when the scanner is set at a predetermined reading out position, for every predetermined number of pixels of the image to obtain averaged image data, and obtaining difference values indicative of the differences between the averaged image data obtained by the averaging.

2. An electrographic copying machine according to claim 1, wherein said automatic focusing means averages the image data from the scanner for every four pixels.

3. An electrographic copying machine according to claim 1, wherein said automatic focusing means obtains each of the difference values by subtracting a lower data value from a higher data value of the averaged image data obtained by the averaging.

4. An electrographic copying machine according to claim 1, wherein said automatic focusing means selectively adds obtained difference values to focus the image.

5. An electrographic copying machine comprising:

an image projector having a projection lens for projecting an image onto an image forming plane through the projection lens;

a scanner for scanning the image projected on the forming plane, said scanner outputting signals which each represent a value of an amount of light scanned for a pixel of the image;

copying means for making a copy of the image projected onto the image forming plane using the signals output by the scanner;

averaging means for averaging the values of the signals output by the scanner for a group of adjacent pixels in an area of the image forming plane;

difference means for determining difference values between average values of adjacent groups of pixels in the area; and focal position adjusting means for adjusting a focal position of the projector lens so that a sum of the difference values determined by the difference means increases.

6. An electrographic copying machine according to claim 5, wherein the scanner is a line sensor including a charge coupled device, the line sensor moving along the image forming plane in a direction perpendicular to a line of the sensor for scanning the image forming plane.

7. An electrographic copying machine according to claim 6 further including:

scanner position setting means for setting the scanner at a position suitable for the focusing means to adjust the focal position of the projector lens, said scanner position setting means moving the scanner stepwise along the image forming plane, obtaining a sum of the difference values at each step with the projector lens at a predetermined focal position, determining a position at which the sum of the difference values is largest, and setting the scanner at the position at which the sum of the difference values is largest.

8. An electrographic copying machine according to claim 5, wherein the image projected by the image projector is recorded on a photographic film.

* * * * *